United States Patent [19]

Jensen

[11] Patent Number: 5,455,322
[45] Date of Patent: Oct. 3, 1995

[54] ALUMINUM NITRIDE FROM INORGANIC POLYMERS

[75] Inventor: James A. Jensen, Hockessin, Del.

[73] Assignee: Lanxide Technology Company, LP, Newark, Del.

[21] Appl. No.: 275,082

[22] Filed: Jul. 13, 1994

Related U.S. Application Data

[63] Continuation of Ser. No. 961,281, Oct. 15, 1992, abandoned, which is a continuation-in-part of Ser. No. 883,326, Jun. 12, 1992, abandoned.

[51] Int. Cl.$^6$ ................................................ C08G 79/00
[52] U.S. Cl. ........................... 528/9; 528/395; 525/389; 423/412; 556/176
[58] Field of Search ................... 528/9, 395; 525/389; 423/412; 556/176

[56] References Cited

U.S. PATENT DOCUMENTS

| | | | |
|---|---|---|---|
| 3,505,246 | 4/1970 | Ehrlich et al. | 260/2 |
| 3,900,505 | 8/1975 | Mole et al. | 556/176 |
| 4,032,553 | 6/1977 | Dozzi et al. | 528/9 |
| 4,064,153 | 12/1977 | Cucinella et al. | 528/9 |
| 4,122,108 | 10/1978 | Cucinella et al. | 556/176 |
| 4,128,567 | 12/1978 | Corbellini et al. | 528/9 |
| 4,687,657 | 8/1987 | Clark et al. | 423/412 |
| 4,696,968 | 9/1987 | Tebbe | 524/610 |
| 4,740,574 | 4/1988 | Bolt et al. | 528/9 |
| 4,767,607 | 8/1988 | Schleich | 423/412 |
| 4,783,430 | 11/1988 | Su | 501/96 |
| 4,983,462 | 1/1991 | Hiai et al. | 528/9 |
| 5,041,512 | 8/1991 | Tebbe | 528/9 |
| 5,061,663 | 10/1991 | Bolt et al. | 501/95 |
| 5,077,244 | 12/1991 | Iyori et al. | 423/412 |
| 5,164,263 | 11/1992 | Bolt et al. | 556/176 |
| 5,167,944 | 12/1992 | Uda et al. | 423/412 |

FOREIGN PATENT DOCUMENTS

| | | |
|---|---|---|
| 259164 | 3/1988 | European Pat. Off. . |
| 331448 | 9/1989 | European Pat. Off. . |
| 1215626 | 9/1986 | Japan ........................ 528/9 |

OTHER PUBLICATIONS

Proceedings of the Academy of Sciences of the U.S.S.R., Sec. Chemistry, vol. 112, Jan.–Feb. 1957, p. 523.
L. V. Interrante et al., Inorganic Chem., 1989, 28, 252–257 and J. Electrochem. Soc. 1989, 136, 472–478.
L. Maya, Adv. Ceram., Mat., 1986, 1, 150–153.
L. I. Zakharkin and I. M. Khorlina, Bull. Acad. Sci. U.S.S.R., Engl. Transl. 1959, 523–524 and Proc. Acad. Sci. U.S.S.R., 1957, 116, 879.
Jiang and Interrante, *Chem. Mater.*, 2, pp. 439–446 (1990), "N,N'-Bis(triethylaluminio)ethylenediamine–and N,N'-Bis(trimethylalumino)ethylene–diamine–Derived Organometallic Precursors to Aluminum Nitride Syntheses, Structures, and Pyrolyses".

(List continued on next page.)

Primary Examiner—John C. Bleutge
Assistant Examiner—Randy Gulakowski
Attorney, Agent, or Firm—Carol A. Lewis

[57] ABSTRACT

This invention provides a process for manufacturing aluminum-nitrogen polymers (i.e., polymers having a backbone of alternating aluminum and nitrogen atoms) in which portions of the polymer have an organic substituent on each aluminum and nitrogen atom. The novel polymers so produced are useful for making green shapes pyrolyzable to AlN articles suitable for high performance applications. The process generally comprises reacting an organic nitrile having the formula $R^1CN$ with a trialkylaluminum compound having the formula $R^2R^3R^4Al$, and optionally heating the reaction product, to form an organoaluminum imine, and heating the organoaluminum imine to a temperature of at least 300° C. and less than 600° C. for at least two hours to form an aluminum-nitrogen polymer. The polymer or the imine can be pyrolyzed to form an aluminum nitride ceramic article. In the foregoing formulae, $R^1$ is an alkyl, cycloalkyl, aryl, aralkyl, hetero(ar)alkyl, or heterocyclic-substituted alkyl group, and $R^2$, $R^3$, and $R^4$ are each independently an alkyl, aryl, or aralkyl group, wherein any alkyl moiety comprises 1–12 carbon atoms, and wherein heteroatoms are selected from nitrogen, oxygen, and silicon.

1 Claim, No Drawings

OTHER PUBLICATIONS

*Patent Abstracts of Japan*, vol. 11, No. 53, Feb. 19, 1987, "Production of Organic Aluminum Nitride Polymer".

*Chemical Abstracts*, vol. 53, No. 22, Nov. 25, 1959, Abstract No. 21734:d–f, "Thermal Decomposition of Addition Products of Diisobutyl–aluminum Hydride and Nitriles".

*Chemical Abstracts*, vol. 107, 1987, Abstract No. 125742c, "Studies of Organometallic Precursors to Aluminum Nitride", Interrante et al.

Mole, T. and Jeffrey, E. A., "Organoaluminum Compounds", Elsevier Publishing Co., New York, 1972, 229–249.

Lloyd, J. E. and Wade, K., "Reactions of Organoaluminum Compounds with Cyanides. Part I. Phenyl Cyanide", *J. Chem. Soc.*, 1965, 2662–2668.

Jennings et al., "Reactions of Organoaluminum Compounds with Cyanides. Part II. Alkyl Cyanides", *J. Chem. Soc.*, 1965, 5083–5094.

*Materials Research Society Symposia Proceedings*, "Studies of Organometallic Precursors to Aluminum Nitride", Interrante et al., vol. 73, 1986, 359–366.

ALUMINUM NITRIDE FROM INORGANIC POLYMERS

This is a continuation of application Ser. No. 07/961,281 filed on Oct. 15, 1992 now abandoned which is a continuation-in-part of U.S. Ser. No. 07/883,326, filed on Jun. 12, 1992 and now abandoned.

BACKGROUND OF THE INVENTION

1. The Field of the Invention

This invention generally relates to pyrolyzable polymers useful for producing articles comprising aluminum nitride. This invention particularly appertains to aluminum-nitrogen polymers prepared from the reaction of an organic nitrile and a trialkylaluminum reagent, and to aluminum nitride ceramics made from such polymers and from precursors therefor.

2. The State of the Art

Aluminum nitride exhibits a unique combination of physical properties, for example, a density of 3.26 g/cm$^3$, a Young's modulus of 280 GPa, a flexural strength of 400 MPa, and a Knoop hardness of 1200 kg/mm$^2$. Aluminum nitride (AlN) is also a refractory material that melts at approximately 2400° C. As such, AlN is very stable in the presence of molten metals and can be used to fabricate various refractory articles for contacting molten metal, such as crucibles, gates, and nozzles.

Aluminum nitride is also an electrical insulator with a bandgap of 6.2 electron volts and has a coefficient of thermal expansion approximating that of silicon. Additionally, AlN has a thermal conductivity nearly ten times greater than alumina, a conventional substrate material used in electronic (e.g., microelectronic, microwave) packages. In high power microelectronic applications, significant amounts of heat are generated by the integrated circuit (IC), which typically comprises a silicon-based body. Removal of the heat generated, and resistance of mechanical stresses due to differing thermal expansion coefficients between the IC and the substrate to which it is bonded, are significant problems. Accordingly, the chemical and physical properties of AlN make it an attractive alternative to the conventional alumina and beryllia substrate materials. Although the thermal conductivity of beryllia is similar to that of aluminum nitride, beryllia presents practical problems because of its severe toxicity.

One drawback to using ceramics is the difficulty of fabricating high tolerance parts for both electronic and structural applications. Machining of ceramics is expensive and generates hazardous fines, especially when the ceramic includes reinforcing fillers or fibers such as silicon carbide whiskers. The art has resorted to compounding ceramic powder with a polymeric carrier to facilitate forming by injection molding, extruding, or casting (e.g., tape casting). With knowledge of the volumetric changes upon both curing of the polymer and sintering of the ceramic particles, high tolerance parts requiring minimal machining can be produced.

There is a continuing interest in polymer precursor materials that can be pyrolyzed directly to ceramic materials, and there is a current interest especially involving aluminum nitride ceramics. For example, aluminum-nitrogen polymers containing no alkyl substitution on the aluminum or nitrogen atoms are described in U.S. Pat. No. 4,747,607, in which thermolysis of a mixture of aluminum chloride and hexamethyldisilazane results in the polymeric $\{(Cl)Al-N(H)\}_n$. Pyrolysis of the polymer in ammonia or under vacuum yielded crystalline AlN. An infusible polymeric aluminum amidimide of the formula $\{(NH_2)Al-N(H)\}_n$ that was pyrolyzed to form AlN has been described by L. Maya, *Adv. Ceram. Mat.*, 1986, 1, 150–153.

Polymers having the repeating unit $\{(R)Al-N(H)\}_n$ are disclosed in U.S. Pat. No. 4,696,968 and in European Pat. Appln. No. 259,164; as described therein, fibers were melt spun from the thermoplastic precursor and pyrolyzed to form AlN fibers. L. V. Interrante et at., *Inorg. Chem.*, 1989, 28, 252–257, and *Mater. Res. Soc. Symp. Proc.*, 1986, 73, 359–366, both report the formation of volatile crystalline precursors than can be sublimed under vacuum. A two-step pyrolysis of these precursors in ammonia resulted first in an insoluble aluminum imide polymer of the form $\{(R)Al-N(H)\}_n$, and ultimately AlN containing less than 0.5% residual carbon and oxygen. U.S. Pat. No. 4,783,430 discloses the formation of $\{(CH_3)Al-N(H)\}_n$ which can be pyrolyzed under helium, argon, or vacuum to form hexagonal AlN.

Polymers having the repeating unit $\{(H)Al-N(R)\}_n$, as disclosed in U.S. Pat. No. 3,505,246, are formed by the reaction of the alane adduct $H_3Al-N(C_2H_5)_3$ with a reagent such as acetonitrile. U.S. Pat. No. 4,687,657 discloses the preparation of a poly-N-alkyliminoalane that can be pyrolyzed in argon or under vacuum to form AlN.

Reacting an organic nitrile with trimethylaluminum produced organoaluminum imines that were not polymerized upon heating to a temperature of 280° C. For example, J. R. Jennings et at., *J. Chem. Soc.*, 1965, pp. 5083–5094, prepared an organoaluminum imine of the formula $(CH_3)_3C(CH_3)=NAl(CH_3)_2$ by heating the adduct of tert-butylnitrile and trimethylaluminum to 150° C. This imine remained unchanged after heating at 280° C. for two hours under nitrogen. Although the authors describe the preparation of various aluminum-nitrogen "polymers" which comprise two organic groups on aluminum and a carbon-nitrogen double bond when decomposition below 280° C. is observed, they acknowledge that only dimeric compounds were identified. J. E. Lloyd et at., *J. Chem. Soc.*, 1965, pp. 2662–2668, describe reacting organoaluminum compounds with benzonitrile at temperatures of 190°–200° C. to yield the dimeric adduct $[C_6H_5C(H)=N-Al(C_2H_5)_2]_2$.

European Pat. Appln. No. 331,448 discloses that AlN can be vapor deposited onto a substrate by heating the substrate in the presence of the vapor of an aluminum-nitrogen compound having the formula $CH_3(R^1)Al-N(R^2)(C_3H_7)$, wherein $R^1$ is alkyl and $R^2$ is hydrogen, alkyl, or aryl. It is described by those applicants that a polymer of this compound may have been made, but neither the structure of the polymer nor any of its properties are disclosed.

Reacting an organic nitrile with diisobutylaluminum hydride produced organoaluminum imines having the formula $RCH=NAl(i-C_4H_9)_2$, which were not isolated. L. I. Zakharkin et at., in both *Bull. Acad. Sci. USSR, Engl. Trans.*, 1959, 523–524, and *Proc. Acad. Sci. USSR, Engl. Trans.*, 1957, 112, 879–881. A gas consisting mainly of isobutene and polymers having the repeating unit $\{Al-N(R)\}_n$ were produced upon heating the organoaluminum imine to 220°–240° C. and then subsequently raising the temperature to 280° C. and maintaining this temperature for three hours. Products derived from hexane nitrile and anisonitrile were similarly prepared and heated at 260°–300° C. During the formation of the polymer, aluminum alkyl groups of the organoaluminum imine are eliminated as isobutene and aluminum-nitrogen bonds are formed.

SUMMARY OF THE INVENTION

A process has now been found for producing aluminum-nitrogen polymers (i.e., polymers having a backbone of alternating aluminum and nitrogen atoms) in which portions of the polymer have an organic substituent on each aluminum and nitrogen atom. The novel polymers so produced are useful for making green shapes pyrolyzable to AlN articles suitable for high performance applications.

The novel process for preparing an aluminum-nitrogen polymer according to this invention generally comprises the steps of (a) reacting an organic nitrile having the formula $R^1CN$ with a trialkylaluminum compound having the formula $R^2R^3R^4Al$, and optionally heating the reaction product, to form an organoaluminum imine and (b) heating the organoaluminum imine to a temperature of at least 300° C. and less than 600° C. for a period of time effective to form an aluminum-nitrogen polymer. It has been discovered unexpectedly that an aluminum-nitrogen polymer having portions wherein both aluminum and nitrogen atoms are organo-substituted can be produced by heating the imine formed in the aforementioned step (a) to a temperature of at least 300° C. and less than 600° C. for a period of at least two hours, and preferably at least three hours. Typically in the above formulae, $R^1$ is a 1–12 carbon alkyl, cycloalkyl, or aryl group, and $R^2$, $R^3$, and $R^4$ are each independently a 1–12 carbon alkyl, aryl, or aralkyl group.

The organoaluminum imine or the aluminum-nitrogen polymer can be pyrolyzed in an inert atmosphere at 800°–2200° C., or in an ammonia atmosphere from as low as 600° C., to produce aluminum nitride. The organoaluminum imine or the aluminum-nitrogen polymer also can be combined with a sinterable or pyrolyzable composition to produce a ceramic-ceramic or metal-ceramic composite.

DETAILED DESCRIPTION OF SPECIFIC EMBODIMENTS

This invention is directed to novel polymers, to the process by which these novel polymers are made, and to the preparation of aluminum nitride articles formed by pyrolysis of these novel polymers or an intermediate precursor of the polymers.

The polymers are prepared by the steps of (a) reacting an organic nitrile having the formula $R^1CN$ with a trisubstituted aluminum compound having the formula $R^2R^3R^4Al$ to form an organoaluminum imine and (b) heating the organoaluminum imine to a temperature of at least 300° C. and less than 600° C. for at least two hours to form an aluminum-nitrogen polymer, in which $R^1$ is an alkyl, cycloalkyl, aryl, aralkyl, heteroaralkyl, or heterocyclic-substituted alkyl group, and $R^2$, $R^3$, and $R^4$ are each independently an alkyl, aryl, or aralkyl group, wherein any alkyl moiety (i.e., part of the $R^i$ group) comprises 1–12 carbon atoms, and wherein heteroatoms are selected from among nitrogen, oxygen, and silicon. Preferably, $R^2$, $R^3$ and $R^4$ each independently is an alkyl group comprising 1–6 carbon atoms. In practice, the process step (a) includes the formation of a nitrile adduct that, upon heating, yields the desired imine.

One or a compatible mixture of nitriles can be used in step (a) for making the imine. Suitable nitriles include, for example, alkyl nitriles such as acetonitrile, propionitrile, and butyronitrile, aryl nitriles such as benzonitrile, phthalonitrile, isophthalonitrile, terephthalonitrile, and various other nitriles such as adiponitrile and acrylonitrile. Compounds having multiple nitrile moieties, such as 1,4-dicyano-2-butene and dicyandiamide, are also suitable.

The organoaluminum imine formed by the reaction of the organic nitrile and the trialkylaluminum is typically present as a dimer containing a heterocyclic core and having the structure:

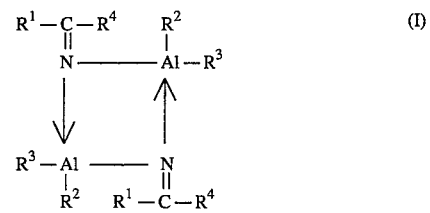

wherein $R^1$, $R^2$, $R^3$, and $R^4$ are as previously defined. Depending upon the nature of the substituents $R^1$, $R^2$, $R^3$, and $R^4$, the imine also can be in the form of a monomer or a higher oligomer also having a heterocyclic core. The exact form of the imine is dictated by the steric and electronic properties of the substituents. As is apparent from formula (I), for convenience it may be assumed that the $R^4$ substituent has migrated from the aluminum atom of the trialkylaluminum compound to the nitrogen atom in the formation of the resulting adduct, although $R^2$ and/or $R^3$ also could have migrated.

An aluminum-nitrogen polymer is produced by heating the organoaluminum imine of formula (I) to a temperature of at least 300° C. and less than 600° C. for at least two hours to form an aluminum-nitrogen polymer. The by-products of the reaction are gaseous hydrocarbons, saturated and/or unsaturated, and related to the $R^2$ and $R^3$ substituents on the aluminum atom. The resulting polymer is generally comprised of the repeating units of formula (II):

although minor amounts of other polymeric products may also be present. The substituents $R^1$ and $R^4$ have the same meaning as given above, $R^5$ is an unreacted group $R^2$ or $R^3$ previously substituted on the aluminum atom as shown in the dimer of formula (I) or is a group $R^6$ derived therefrom and having resulted from the process of heating the imine to form the desired polymer, and $R^7$ is either H or $R^2$ or $R^3$. For example, if $R^2$ is isobutyl, then $R^5$ may be isobutyl, or isobutenyl as $R^6$, the group formed by heating the isobutyl-substituted imine. The most preferred substituents for the aluminum atom in the dimer of formula (I) for producing the polymer of formula (II) are those which are sterically hindered, such as tert-butyl. Substituents having an available γ-hydrogen, such as isobutyl and propyl, are preferred over those having only an available β-hydrogen or α-hydrogen (wherein the α, β, γ relationship describes the relative increasing distance of each carbon atom from the aluminum atom). A possible mechanism for the polymerization reaction is disclosed in the above application from which this application is a continuation-in-part.

The ratios or yields of the resulting products, that is, the various amounts of repeating units in the polymer having the aluminum atom substituted by various amounts of $R^2$, $R^3$, and $R^6$ groups, depend upon the time of heating, the maximum temperature of heating, and the structure of the trialkylaluminum reactant used. The degree of polymerization, n, is typically from about six to about twenty, depending upon the time of heating, the maximum temperature of heating, and the structure of the trialkylaluminum reactant used. Longer heating times and higher heating temperatures generally provide a greater degree of polymerization. The structure of the trialkylaluminum reactant refers to such functional characteristics as the availability of a γ-hydrogen to facilitate formation of gaseous by-products, as discussed above.

Production of the aluminum-nitrogen polymer from the imine is preferably conducted without a solvent, although the reaction may be performed in the presence of a solvent. Suitable solvents are selected from aprotic organic solvents such as $C_{5+}$ alkanes (e.g., hexane, heptane) and aprotic derivatives thereof (e.g., diethyl ether, tetrachloroethane), and aryl compounds (e.g., benzene, toluene, xylene) and aprotic derivatives thereof (e.g., diphenyl ether). For most applications, the production of a polymer that is soluble or fusible (i.e., meltable or soluble) is preferred. For example, preferred polymers are those which are not highly crosslinked and those which have low degrees of polymerization, such as where n is from 6 to 20.

Formation of an aluminum-nitrogen polymer from the organoaluminum imine may be initiated by heating the imine to a temperature of at least 300° C. but less than 600° C. for a period of at least two hours, preferably three hours, and most preferably eight hours. The degree of polymerization may be estimated by the resulting increase in viscosity of the neat polymer; the imine precursor is typically a liquid. When periods of heating of less than two hours are used, very little viscosity increase occurs, thus indicating insignificant degrees of polymerization. The viscosity of the polymer can be controlled by varying the heating cycle: lower temperatures and/or shorter heating times for polymerization result in lower viscosity liquid polymers, whereas higher temperatures and/or longer heating times result in higher viscosity liquid polymers. As the polymerization reaction continues to completion, a semi-solid or solid polymer is obtained.

Control of the viscosity of the polymer is a significant factor because it allows for producing a polymer better suited to a particular forming operation. The aluminum-nitrogen polymer of this invention is subsequently formed into a green article and pyrolyzed to form an AlN ceramic article. One advantage of a polymeric ceramic precursor is the ability to form complexly shaped green articles from which a ceramic having a similarly complex shape can be manufactured. Various polymer shaping methods, such as casting, injection molding, and extrusion (including film forming), can be used and/or modified more easily to produce a green article having the desired geometry and tolerances if the viscosity of the precursor can be varied controllably.

In addition to thermally induced polymerization, the polymers of the present invention, when comprising unsaturated substituents, can be cross-linked by such forms of energy as ultraviolet radiation, electron beam, microwave radiation, and coherent light energy (e.g., laser). Anionic or cationic polymerization methods can also be used to initiate cross-linking. Free radical generators, such as organic peroxides and azo compounds, as well as energy absorptive compounds (i.e., compounds sensitive to a specific wavelength, e.g., ultraviolet, or broad band absorbers), and other polymerization or cross-linking aids are optionally added to the polymer composition.

The novel polymers of this invention may also contain fillers and adjuvants. When these additives remain in the polymer during the pyrolyzation process, they are preferably comprised of materials of a composition that will not degrade the physical properties of the AlN ceramic formed from pyrolyzation, and more preferably enhance the properties of the green article or the resultant ceramic. Suitable fillers include, for example, silica, silicon nitride, aluminum nitride, boron nitride, boron carbide, alumina, boron oxide, boron carbide, titanium nitride, titanium carbide, zirconia, silicon, sialon(s), zirconium carbide, silicon carbide, and any mixture thereof. The fillers may be provided in such forms as fibers, whiskers, platelets, powders, and any mixture thereof.

The aluminum-nitrogen polymers of this invention can be formed into various geometries conventional for typical polymer forming. Exemplary geometries include: complex shapes formed by casting and injection molding; films, tapes, and similar geometries formed by extrusion or casting; and fibers formed by spinning, casting, or extruding. These polymers may also be applied as a coating to a substrate, which may be a permanent substrate such as another ceramic article (preferably refractory) or a substrate which is destroyed during the pyrolysis process. For example, these polymers, or the liquid nitrile adduct precursor thereto, can be coated onto a ceramic substrate suitable for electronic applications (such as alumina) and pyrolyzed to provide a thin film compatible AlN coating on the substrate. In this example, a lower cost alumina substrate can be made compatible for thin film applications without the need for the entire substrate to be fabricated by conventional techniques from more expensive aluminum nitride.

The aluminum-nitrogen polymers may also be formed into a foamed article. Refractories having a fine, open microstructure, such as a foam, are useful for filtering molten metals and other refractory or high temperature liquids. Chemically inert, physically strong, porous structures are also useful as catalyst supports. A foamed ceramic can be made by producing a foamed green polymeric article by any of various methods known in the polymer arts (e.g., using an inert gas generating compound mixed with the polymer), and subsequently pyrolyzing the foamed green article. In yet another utility, a foamed green Al—N polymeric or foamed dense AlN article made according to this invention can be infiltrated with a composition having ceramic and/or metal particles and/or another ceramic precursor. The infiltrated composition can be in the form of sinterable particles in a polymeric binder, or a slurry of sinterable particles. The composite green article is then pyrolyzed and/or sintered as necessary to produce an aluminum nitride composite. Another method of fabricating a composite aluminum nitride ceramic is by substituting the present aluminum-nitrogen polymers, in whole or in part, for a conventional thermoplastic binder admixed with ceramic particles for injection molding and tape casting. Likewise, these polymers can be substituted in whole or in part for a binder for metal powder injection molding (MIM) to provide a metal-ceramic composite or a cermet.

In connection with the foregoing methods for making a ceramic-ceramic composite, a preferred composition is one that can be pyrolyzed to form silicon carbide. In one embodiment, the polymeric silicon carbide precursor can contain silicon carbide whiskers, as described in U.S. Pat. No. 4,942,011, the disclosure of which is incorporated herein by reference. This disclosure also refers to examples of various polymeric silicon carbide precursors, such as polycarbosilanes, polysilazanes, polysilanes, organosilsesquioxane-containing sol-gels, and polyorganosiloxanes, by reference, respectively, to U.S. Pat. Nos. 4,052,430, 4,312, 970, 4,298,558, 4,472,510, and 4,152,509, and others, all incorporated herein by reference.

To facilitate forming a polymeric green article into the desired geometry, these novel polymers can be dissolved in aprotic organic solvents such as $C_{5+}$ alkanes (e.g., hexane, heptane) and aprotic derivatives thereof (e.g., diethyl ether, tetrachloroethane), and aryl compounds (e.g., benzene, toluene, xylene) and aprotic derivatives thereof (e.g., diphenyl ether).

If desired, a group $R^8$ can be introduced into the polymer by transamination with ammonia or a primary amine of the formula $R^8NH_2$ for a time sufficient to introduce —N($R^8$)— groups into the polymer. $R^8$ can be selected from among groups such as hydrogen, alkyl, cycloalkyl, alkenyl, cycloalkenyl, and alkynyl, as well as aryl, aralkyl, aralkenyl, and aralkynyl, wherein any alkyl (-enyl, -ynyl) substituent generally contains 1–12 carbon atoms. Concomitant with transamination is the release of $H_2NCR^1R^4R^7$.

Treatment of the aluminum-nitrogen polymer of formula (II) with a primary amine results in a polymer in which at least some of the repeating units now further comprise the unit of formula (III):

The value y depends upon the relative amount of the amine present for reaction with respect to the amount of polymer, the duration of the reaction, and the prior state of the polymer after any cross-linking; treatment with the amine can be conducted before any cross-linking.

In an especially preferred embodiment, the amine is ammonia; that is, where $R^8$ is hydrogen. It has been found that treatment of the polymer with gaseous ammonia cures the polymer into a more infusible state. Prior art aluminum-nitrogen polymers containing no alkyl substitution on the nitrogen, consisting of units of —NH—Al(R)—, are infusible and therefore difficult to process. An unexpected advantage of the present invention is the production of a fusible ceramic precursor that can be processed by conventional polymer forming techniques and then cured into a desired geometry by treatment with ammonia. For example, the present polymers can be spun into fibers and then cross-linked with gaseous ammonia as a surface treatment to improve such parameters as the ease of handling. A further advantage of this embodiment is that transamination, such that the nitrogen has a hydrogen substituent, increases the ceramic yield upon pyrolysis of the polymer.

Continued heating of the aluminum-nitrogen polymer at temperatures of at least 300° C. for at least two hours results in the evolution of gaseous hydrocarbons and the formation of new aluminum-nitrogen bonds. The resulting polymer contains aluminum atoms bonded to three, rather than two, nitrogen atoms.

The green article formed from the present aluminum-nitrogen polymers is formed into an aluminum nitride ceramic article by pyrolysis. The pyrolysis reaction is preferably carried out in a non-oxidizing atmosphere; the atmosphere may be an inert atmosphere such as nitrogen or argon, or it may be a reducing atmosphere such as ammonia or hydrogen. Pyrolysis in nitrogen is preferably conducted at a temperature from about 800° C. to about 2200° C., more preferably between about 1200° C. and 2000° C., and most preferably between 1400° C. and 1700° C. Pyrolysis in ammonia can be accomplished within the same temperature ranges and even as low as approximately 600° C.

An AlN ceramic can also be produced by pyrolyzing the imine formed by reacting an organic nitrile with a trialkylaluminum compound, step (a) of the present process. Pyrolysis should be conducted in the same environments as just described for the aluminum-nitrogen polymers. Further, an AlN ceramic coating can be chemically deposited onto a substrate by heating the substrate to the pyrolysis temperature in the presence of vapors of the imine.

Various details of the invention will be further described by the following examples, which are meant to illustrate the invention and not intended to imply that the invention is limited to the compounds and/or conditions described.

EXAMPLE 1

Part A: Preparation of an organoaluminum adduct from acetonitrile and triethylaluminum.

A vessel was prepared containing 5 ml (3.93 g, 95.7 mmol) of acetonitrile and maintained at 0° C. Approximately 25 ml of a 1.9 molar solution of triethylaluminum (47.5 mmol) in toluene were added to the vessel. The reaction mixture was stirred continuously while the temperature was first maintained at 0° C., and after 30 minutes the vessel was allowed to warm to room temperature (approx. 25° C.). After two hours, the stirring was discontinued and the toluene solvent and excess acetonitrile were removed by vacuum from the reaction mixture. The product was a light yellow liquid adduct in a yield of 7.3 g.

Part B: Preparation of an organoaluminum imine from the adduct.

The light yellow liquid adduct produced in Part A was heated to 130° C. under nitrogen at atmospheric pressure for three (3) hours to yield 6.1 g of the product imine $CH_3C(C_2H_5)$=$NAl(C_2H_5)_2$.

Part C: Preparation of a polymer from the imine.

4.8 g of the organoaluminum imine prepared in Part B were heated to 300° C. under nitrogen at atmospheric pressure for eight (8) hours to yield 3.2 g of a brittle, glassy, orange polymer. During the course of heating, 1.6 g of a gas comprising mainly ethane and ethylene was evolved.

Part D: Preparation of an AlN ceramic from the polymer.

A one gram sample of the polymer prepared in Part C was placed onto an alumina boat and heated in a cold mullite tube furnace, under nitrogen at atmospheric pressure, at a rate of approximately 10° C. per minute to a temperature of 1600° C. The maximum pyrolization temperature was maintained for approximately two hours, and the part was cooled to room temperature over four hours.

X-ray analysis of the product confirmed the presence of crystalline aluminum nitride.

EXAMPLE 2

Part A: Preparation of an organoaluminum adduct from benzonitrile and triethylaluminum.

A vessel was prepared containing 4.85 ml (4.9 g, 47.5 mmol) of benzonitrile and maintained at 0° C. Approximately 25 ml of a 1.9 molar solution of triethylaluminum (47.5 mmol) in toluene were added to the vessel. The reaction mixture was stirred while the temperature was first maintained at 0° C., and after 30 minutes the vessel was allowed to warm to room temperature. After two hours, the toluene solvent and excess benzonitrile were removed under vacuum from the reaction mixture. The product was a light yellow liquid adduct in a yield of 9.8 g.

Part B: Preparation of an organoaluminum imine from the adduct.

The light yellow liquid adduct produced in Part A was heated to 135° C. under nitrogen for three (3) hours to yield 8.7 g of the product imine $C_6H_5C(C_2H_5)=NAl(C_2H_5)_2$.

Part C: Preparation of a polymer from the imine.

7.8 g of the organoaluminum imine prepared in Part B were heated to 300° C. under a nitrogen atmosphere for eight (8) hours to yield 6.2 g of a brittle, glassy, orange polymer. During the course of heating, 1.6 g of a gas comprising mainly ethane and ethylene was evolved.

Part D: Preparation of an AlN ceramic from the polymer.

A one gram sample of the polymer prepared in Part C was placed onto an alumina boat and heated in a cold mullite tube furnace, under a nitrogen atmosphere, at a rate of approximately 10° C. per minute to a temperature of 1600° C.

X-ray analysis of the product confirmed the presence of crystalline aluminum nitride.

Various modifications of the embodiments described herein will be envisaged by the artisan upon a perusal of this specification, and such are intended to be within the scope and spirit of the present invention as defined by the following claims.

What is claimed is:

1. A polymer consisting essentially of repeating units of formula (II):

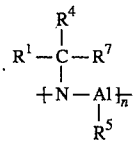

wherein $R^1$ is an alkyl, cycloalkyl, aryl, aralkyl, heteroaralkyl or heterocyclic-substituted alkyl group, $R^4$ is an alkyl, aryl or aralkyl group, $R^5$ is an alkyl, aryl or aralkyl group or is a group $R^6$ derived from heating an alkyl, aryl or aralkyl group, $R^7$ is H or an alkyl, aryl or aralkyl group, and n is an integer between 8 and 21.

* * * * *